H. F. & G. F. SHAW.

Improvement in Hay-Tedders.

No. 129,431.

Patented July 16, 1872.

WITNESSES

INVENTORS 129,431

UNITED STATES PATENT OFFICE.

HENRY F. SHAW AND GEORGE F. SHAW, OF WEST ROXBURY, MASS.

IMPROVEMENT IN HAY-TEDDERS.

Specification forming part of Letters Patent No. 129,431, dated July 16, 1872.

*To all whom it may concern:*

We, HENRY F. SHAW and GEORGE F. SHAW, of West Roxbury, in the county of Norfolk and State of Massachusetts, have invented certain new and useful Improvements in Hay-Tedders, of which the following is a specification:

The Nature of the Invention.

The nature of the invention consists, first, in arranging a series of tangential strikers on a revolving shaft and combining the same with a series of stationary ribs or cast-offs; second, in certain devices by which the driving-wheels may be thrown out of gear of the operating parts.

General Description.

Figure 1:
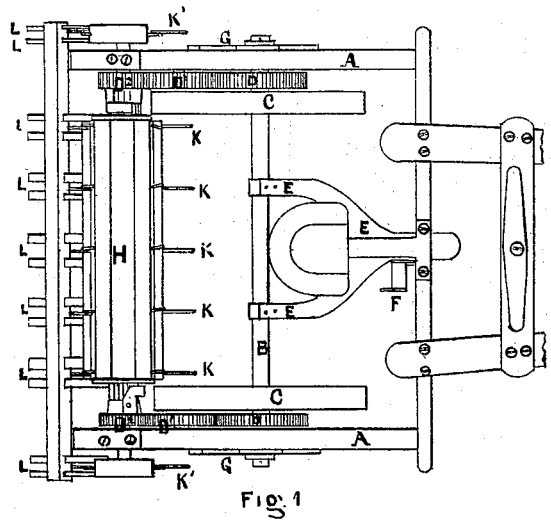
Figure 1 is a plan showing our invention.
Figure 2:
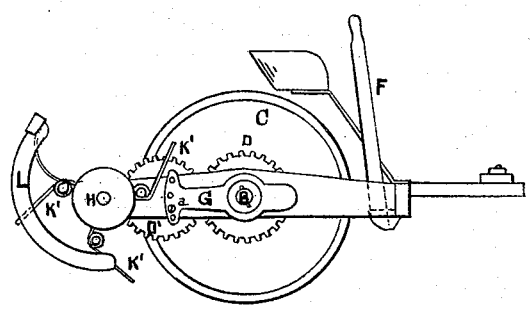
Fig. 2 is an elevation of the same.
Figure 3:
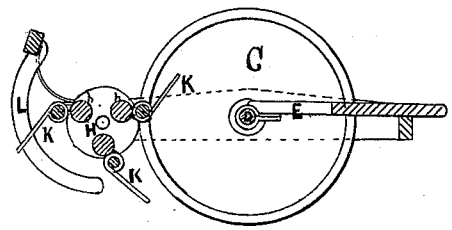
Fig. 3 is a vertical section through the same.

Let A A represent the general frame, to which the other parts are attached. The driving-wheels C C are attached to the shaft B, and are placed as shown in Fig. 1, so as to run inside of the frame A A. The bearings of the shaft B are fixed in adjustable levers attached to the frame A A (one of the levers G is shown in Fig. 2) in such a manner that the shaft B and gears D D may slide back and forth—that is, into and out of gear with the wheels $D^1 D^1$. The movement of the shaft B is effected by the branched holder E E E, Fig. 1. This holder E E E is operated by the hand-lever F, Fig. 2. The shaft B is also adjusted vertically in the frame so that the latter may operate with different-sized horses. This adjustment is effected by the levers G, these levers being pivoted at $d$, Fig. 2, and held in position by a pin, $a$, which may be placed in differently-located holes, as shown at Fig. 2. The compound shaft H $h\ h\ h$ is hung at the rear end of the frame, and is driven by the gear-wheels $D^1 D^1$ engaging with the wheels $D^2 D^2$, Fig. 1. Upon the parts $h\ h\ h$ of the shaft H we hang a series of strikers, K K K, the strikers being arranged tangentially, as shown, so that they may not act as lifters to gather up the grass. We are aware that lifting-teeth have been placed upon a revolving shaft radially for the purpose of gathering hay, and from experience we find that such teeth will not work at all as tedders, hence we have adopted this plan of arranging the teeth. The guard-pieces L L serve to throw off any grass that might get lodged between the teeth. The guards may be made of any suitable material and secured to the frame A A in any suitable manner. To render our tedder more perfect in its action we extend the tedder-shaft H beyond the frame and attach to the ends the outside teeth or strikers K' K', Fig. 1.

We claim as our invention—

1. The combination of the guards L L, &c., with the revolving strikers K K, when the said strikers are arranged tangentially on the shaft H $h\ h\ h$ so as to operate substantially as described, and for the purpose set forth.

2. The combination of the shaft B with the frame A A and the holder E E E, when the said parts are arranged to operate substantially as described, and for the purpose set forth.

HENRY F. SHAW.
GEORGE F. SHAW.

Witnesses:
FRANK G. PARKER,
CHAS. J. BATEMAN.